(12) United States Patent  
Samanta et al.

(10) Patent No.: US 9,399,864 B2  
(45) Date of Patent: Jul. 26, 2016

(54) AEROGEL BLANKET AND METHOD OF PRODUCTION

(71) Applicant: Cabot Corporation, Boston, MA (US)

(72) Inventors: Susnata Samanta, Medford, MA (US); Peter F. Pescatore, Wakefield, MA (US); Bryan P. Thomas, York, SC (US)

(73) Assignee: Cabot Corporation, Boston, MA (US)

( * ) Notice: Subject to any disclaimer, the term of this patent is extended or adjusted under 35 U.S.C. 154(b) by 270 days.

(21) Appl. No.: 14/203,609

(22) Filed: Mar. 11, 2014

(65) Prior Publication Data

US 2014/0273701 A1 Sep. 18, 2014

Related U.S. Application Data

(60) Provisional application No. 61/790,772, filed on Mar. 15, 2013.

(51) Int. Cl.
| | |
|---|---|
| C04B 14/04 | (2006.01) |
| E04B 1/78 | (2006.01) |
| D04H 1/413 | (2012.01) |
| C04B 26/06 | (2006.01) |
| F16L 59/02 | (2006.01) |
| C04B 111/28 | (2006.01) |

(52) U.S. Cl.
CPC . *E04B 1/78* (2013.01); *C04B 26/06* (2013.01); *D04H 1/413* (2013.01); *C04B 2111/28* (2013.01); *C04B 2201/32* (2013.01); *F16L 59/028* (2013.01); *Y10T 442/608* (2015.04); *Y10T 442/696* (2015.04); *Y10T 442/699* (2015.04)

(58) Field of Classification Search
CPC .......... B29C 67/00; C04B 35/64; C04B 14/04
See application file for complete search history.

(56) References Cited

U.S. PATENT DOCUMENTS

| | | | |
|---|---|---|---|
| 4,873,218 | A | 10/1989 | Pekala |
| 5,086,085 | A | 2/1992 | Pekala |
| 5,399,422 | A | 3/1995 | Dijkema et al. |
| 7,635,411 | B2 | 12/2009 | Rouanet et al. |
| 2006/0125158 | A1 | 6/2006 | Rouanet et al. |
| 2012/0009834 | A1 | 1/2012 | Augustyniak et al. |

FOREIGN PATENT DOCUMENTS

| | | |
|---|---|---|
| EP | 2281961 A1 | 2/2011 |
| EP | 2338853 A2 | 6/2011 |
| WO | WO 2010/126792 A1 | 11/2010 |
| WO | WO 2011/012710 A1 | 2/2011 |

OTHER PUBLICATIONS

International Search Report and the Written Opinion of the International Searching Authority, or the Declaration of International Patent Application No. PCT/US2014/022919, mailed on Jul. 10, 2014.

*Primary Examiner* — Andrew Piziali

(57) ABSTRACT

A method of making a nonwoven wet laid aerogel blanket is provided. The aerogel blanket can exhibit improved thermal conductivity, lower corrosivity, lower dust production and a uniform structure. The blanket can be made from an aerogel floc that is formed from a slurry of aerogel particles.

20 Claims, 6 Drawing Sheets

AEROGEL BLANKET AND METHOD OF PRODUCTION

CROSS REFERENCE TO RELATED APPLICATIONS

This patent application claims the benefit of U.S. Provisional Patent Application No. 61/790,772, filed on Mar. 15, 2013, the disclosure of which is incorporated herein by reference.

FIELD OF THE DISCLOSURE

The present disclosure relates to aerogels and in particular to the use of aerogels in insulative materials.

BACKGROUND

Aerogels, and in particular silica aerogels, exhibit low density and low thermal conductivity making them useful as insulative materials. Aerogels can be used as insulating materials by themselves or can be combined with other materials such as fibers, adhesives and foams. Aerogels can be formed by removing solvent from hydrogels, such as through supercritical drying techniques or via solvent substitution combined with ambient pressure drying. Silica aerogels are typically hydrophilic but can be rendered hydrophobic through the use of specific treating agents.

SUMMARY

In one aspect, a nonwoven insulation blanket is provided, the blanket comprising aerogel particles, fibers, and a binder, wherein the density of aerogel particles in the upper 10% of a cross section of the blanket is within +/−20% of the density of aerogel particles in the lowest 10% of the cross section. In another embodiment, an aerogel blanket is provided, the blanket comprising aerogel particles, fibers and a polymer selected from polyamine, polyacrylamide, dicyandiamide, or polydiallyldimethylammonium chloride. In another embodiment, an uncovered uniform insulation blanket is provided, the blanket comprising aerogel and fibers, the blanket exhibiting aerogel dust production of less than less than 10 mg/m3, less than 5 mg/m3, less than 3 mg/m3 or less than 1 mg/m3 when tested using a 10 flex test. In another embodiment, an insulation blanket is provided, the blanket comprising aerogel and fibers and exhibiting corrosivity of less than 1 ppm HCl when subjected to corrosion test method ASTM C1617. In another embodiment, a flexible, uniform, uncovered insulation blanket is provided, the blanket comprising at least 50% aerogel by volume, the blanket producing dust of less than 0.1%, less than 0.01% or less than 0.001% of the weight of a blanket sample when analyzed using the 10 flex test or the 3 tap test. In another embodiment, a flexible, uniform, uncovered insulation blanket is provided, the blanket comprising at least 50% aerogel by volume, the blanket producing aerosol dust of less than 10 mg/m3, less than 5 mg/m3, less than 3 mg/m3 or less than 1 mg/m3 when a 10 by 10 cm or 20 by 20 cm blanket sample is analyzed using the 10 flex test.

In some embodiments, the blanket includes an infrared opacifier. The blanket may exhibit a thermal conductivity of less than 22 mW/m° K or less than 19.0 mW/m° K and in some embodiments has a density of less than 0.2 g/cc, less than 0.15 g/cc, less than 0.13 g/cc or less than 0.12 g/cc. The blanket may be transluscent. When analyzed using ASTM method C1617 the blanket may exhibit a corrosivity of less than 1 ppm HCl or less than deionized water. The blanket may include aerogel particles and the aerogel particles may have an average diameter of less than 2.0 mm, have an average diameter of less than 4.0 mm, exhibit a water contact angle of greater than or equal to 90 degrees, may be derived from waterglass, and/or may have a caloric content of less than 10 MJ/Kg, less than 8 MJ/Kg, less than 7 MJ/Kg or less than 6 MJ/Kg. When tested using ASTM E84, the blanket may exhibit a flame spread index of less than 25, less than 20, less than 15, less than 10, less than 5 or 0 and/or a smoke developed index of less than 15, less than 10, less than 5 or 0. The blanket may exhibit shrinkage of less than 1%, less than 2% or less than 4% at 650° C. when tested using ASTM method C356. The blanket may include a polymer selected from polyamine, polyacrylamide, dicyandiamide, or polydiallyldimethylammonium chloride. Fibers in the blanket may have an average length of less than 5 mm and in some embodiments none, or essentially none, of the fibers have a length greater than 5 mm.

In another aspect a method of making a nonwoven aerogel blanket is provided, the method comprising mixing aerogel particles and non-aerogel fibers with water to produce an aqueous slurry, flocculating and/or coagulating the slurry to form floc and a supernatant, the floc including aerogel particles and non-aerogel fibers, and dewatering the floc to make the nonwoven aerogel blanket. The aqueous dispersion may include a charged compound that is a binder. The method can include contacting a wetting agent with the aerogel particles. Flocculating or coagulating may break an emulsion, and flocculating can comprise neutralizing charges in the dispersion and/or altering the pH of the slurry. The floc may include a homogeneous mixture of aerogel particles and fibers. An emulsion may be formed and it may be formed by adding a charged emulsifying polymer, an uncharged compound and/or a compound having a charge opposite to that of the emulsifying polymer. Flocculation can occur via charge neutralization or by bridging of particles.

DETAILED DESCRIPTION

Figure 1:
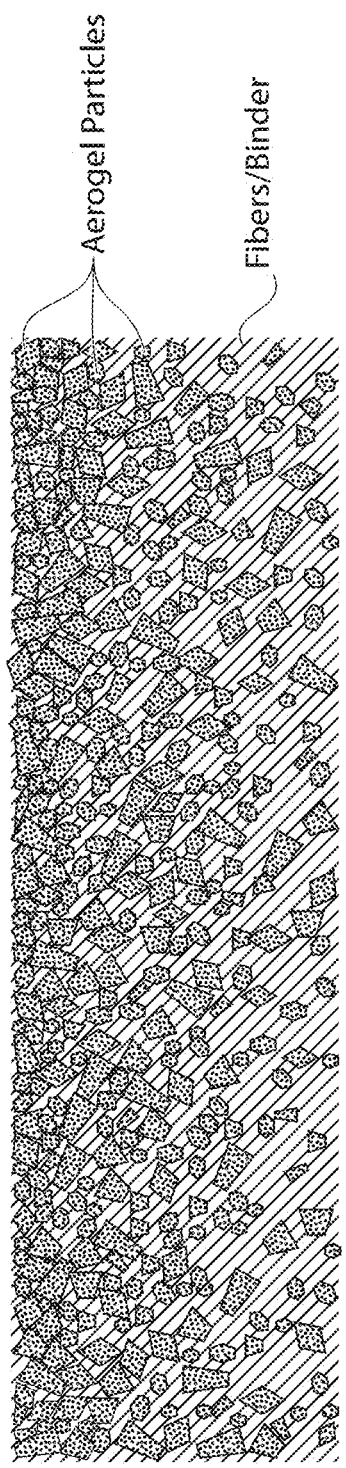
FIG. 1 provides a schematic depiction of a cross section of a nonwoven wet laid aerogel blanket manufactured using known methods.

The methods described herein can be used to make an insulative aerogel blanket that can exhibit, for instance, improved thermal insulation, reduced levels of dust, lower corrosivity and a consistent, uniform construction. These blankets are referred to as nonwoven wet laid aerogel blankets. A "wet laid" process is one in which the fibers or particles in the blanket are suspended or dispersed in water. Wet laid processes are disclosed in which aerogel particles and optional materials such as fibers and opacifiers are flocculated from an aqueous slurry to form a substantially stable homogeneous suspension of particles (floc). The floc can separate from the aqueous based solvent, forming a two phase system consisting of flocculated aerogel particles and a supernatant of substantially water. The flocculated material can support an even distribution of the different particles from which the blanket can be made. This stable, consistent distribution of particles can provide an aerogel blanket that exhibits a uniform composition throughout. The blanket can be used in applications at temperatures up to or greater than 650° C. and in many embodiments generates little or no dust under standard conditions of industrial use. The blanket may also exhibit minimal shrinkage at high temperatures and can be noncorrosive. The blanket may be flexible or rigid and can be wrapped to various contours. A variety of different aerogels can be used, and in one set of embodiments the aerogel blanket can be made using low density aerogel particles that have been previously gelled and dried. This allows for multiple aerogel types to be used in a single blanket and avoids problems that can develop when forming aerogels in situ in a fibrous matrix. Fibers, opacifiers and any other additives can be mixed with a previously prepared hydrophobic aerogel, or mixtures of different aerogels, to form the blanket. The aerogel need not be formed, or gelled and dried, in the presence of the fibers in order to form a blanket.

The most common aerogels are formed of either alumina or silica. Silica aerogels in particular possess a number of properties that make them a good choice for thermal insulation. For instance, these aerogels are typically light and exhibit very low thermal conductivity. Silica aerogels can be made or rendered hydrophobic and these hydrophobic silica aerogels are resistant to moisture and may be useful in some insulating applications without additional treatment. Aerogel particles may be used in a loose unbound form, or may be bound together by an adhesive, a network of fibers, a substrate or additional materials. Many aerogels can withstand high temperatures making them suitable for many industrial processes. Aerogel blankets can be used for industrial insulation in applications such as machinery, chemical processing equipment, pipe insulation, insulation for aircraft and parts thereof, building insulation, aerospace insulation, daylighting, insulated glass units and automotive insulation.

Aerogel particles can be incorporated into an insulation blanket using methods that include wet laid processes. Wet laid processes, such as the ones described in U.S. Pat. Nos. 7,635,411 and 5,399,422 (both of which are incorporated by reference herein), use an aqueous slurry to disperse aerogel particles, fibers and other additives. The slurry can then be dewatered to form a layer of aerogel particles, fibers and additives that can be dried and optionally calendared to produce a nonwoven aerogel blanket.

The nonwoven wet laid aerogel blankets described herein may be of any size and shape that can be made using wet laid processes. Blankets may be manufactured continuously, for example on a web, or individually using, for example, a batch process. In some embodiments, aerogel blankets may have a length or width dimension of 81 cm, 122 cm or 152 cm. A second dimension may be the same or larger, particularly when produced using a continuous process. The blankets may be rigid or flexible and can be cut to shape for specific applications. The blankets typically have a length and width that is more than 20 or more than 50 times the thickness of the blanket. Thicknesses may vary or may be consistent across a blanket and the average thickness of a blanket may be greater than 5 mm, greater than 10 mm, greater than 15 mm or greater than 20 mm. In other embodiments, the thickness of the blanket may average less than 15 mm, less than 13 mm, less than 10 mm or less than 8 mm.

The blankets may exhibit excellent insulative properties. At 150° C., 300° C., or 650° C., for example, the thermal conductivity of the blankets can be less than about 1 W/m° K, less than about 500 mW/m° K, less than about 100 mW/m° K, less than about 50 mW/m° K, less than about 25 mW/m° K less than about 20 mW/m° K or less than about less than about 19 mW/m° K. In one embodiment, for example, at 300° C., blanket thermal conductivity may be less than 40 mW/m° K or less than or equal to 38 mW/m° K. In another example, at 150° C., different embodiments may exhibit thermal conductivity of less than 55 mW/m° K, less than 50 mW/m° K, less than 40 mW/m° K or less than or equal to 35 mW/m° K. When compared to nonwoven wet laid blankets of the same composition and thickness made using known wet laid techniques (e.g., U.S. Pat. No. 7,635,411), the blankets described herein can result in reductions in thermal conductivity of greater than 2%, greater than 5%, greater than 10% or greater than 20%. This can be a result of, for example, an even distribution of conductive particles and/or nonconductive particles throughout a cross-section of the blanket. Similarly, when compared to nonwoven wet laid blankets of the same composition and thickness made using known wet laid techniques, the friability of the blankets disclosed herein is reduced, and levels of aerogel and/or opacifier dust formation can be reduced by greater than 10%, greater than 20%, greater than 30% or greater than 50%. In some embodiments, the aerogel blankets may exhibit tensile strength of greater than 250 N/5 cm 356 N/5 cm, greater than 500 N/5 cm or greater than 600 N/5 cm. The blankets may be hydrophobic and may absorb less than 40%, less than 30%, less than 20%, less than 10%, less than 5%, less than 3% or less than 1%, of their weight in water when tested using, for example, ASTM method C1511. The nonwoven aerogel blankets described herein may exhibit low corrosivity when used as insulation adjacent to metals such as steel. For example, when subjected to corrosion test method ASTM C1617 the blankets may exhibit corrosivity less than 1 ppm HCl or less than DI water.

In some embodiments, the aerogel blanket may be resistant to shrinkage at high temperature. For example, at 650° C., the blanket may shrink less than 4%, less than 2% or less than 1% when tested using, for example, ASTM method C356. This resistance to shrinkage means that these blankets can be used, for example, in high temperature applications without deforming or losing their original structure, thickness and/or insulative ability. The density of the blankets may be low and in some embodiments the bulk density of the blankets can be less than 0.2 g/cc, less than 0.15 g/cc, less than 0.13 g/cc or less than 0.12 g/cc.

In many instances, known wet laid processes for producing aerogel blankets can fail to result in an even distribution of aerogel and fibers. Wetting agents can aid in dispersing a hydrophobic aerogel and mechanical mixers can help to form homogeneous slurries. Polymer latex emulsions can also be used to suspend particles in an aqueous system. However, the slurries remain homogeneous for extremely short periods, and by the time that the materials are dewatered, the solids (aerogel and fibers) can start to separate from each other and form discernible strata. Therefore, one portion of the blanket, typically the upper portion, will contain a greater proportion of aerogel particles while the lower portion will contain a greater concentration of fibers and opacifiers, if present. For example, see FIG. 1 that provides a schematic drawing showing a cross-section of a nonwoven aerogel blanket made using known wet laid processes such as the process described in U.S. Pat. No. 7,635,411. The illustration shows a high concentration of aerogel particles in the upper portion of the blanket and a low concentration of aerogel in the lower portion of the blanket. The portion with the high concentration of aerogel particles can lack adhesiveness between particles and a concurrent reduction in mechanical strength, and the blanket can shed aerogel particles when bent, vibrated or chafed. This separation of aerogel particles and other materials can also affect heat transfer, resulting in poorer insulation capability compared to that of a homogeneous blanket. Efforts to further stabilize the aerogel slurry so that it does not form layers have not resulted in significant improvement to the distribution of aerogel particles throughout the thickness of the blanket.

Figure 2:
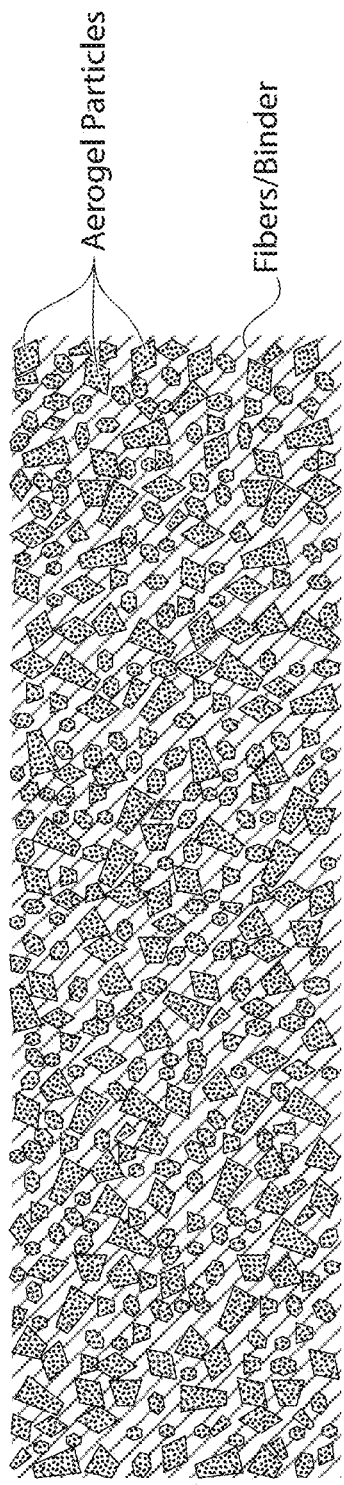
FIG. 2 provides a schematic depiction of a cross section of an embodiment of a nonwoven wet laid aerogel blanket manufactured using methods described herein.
Figure 3:
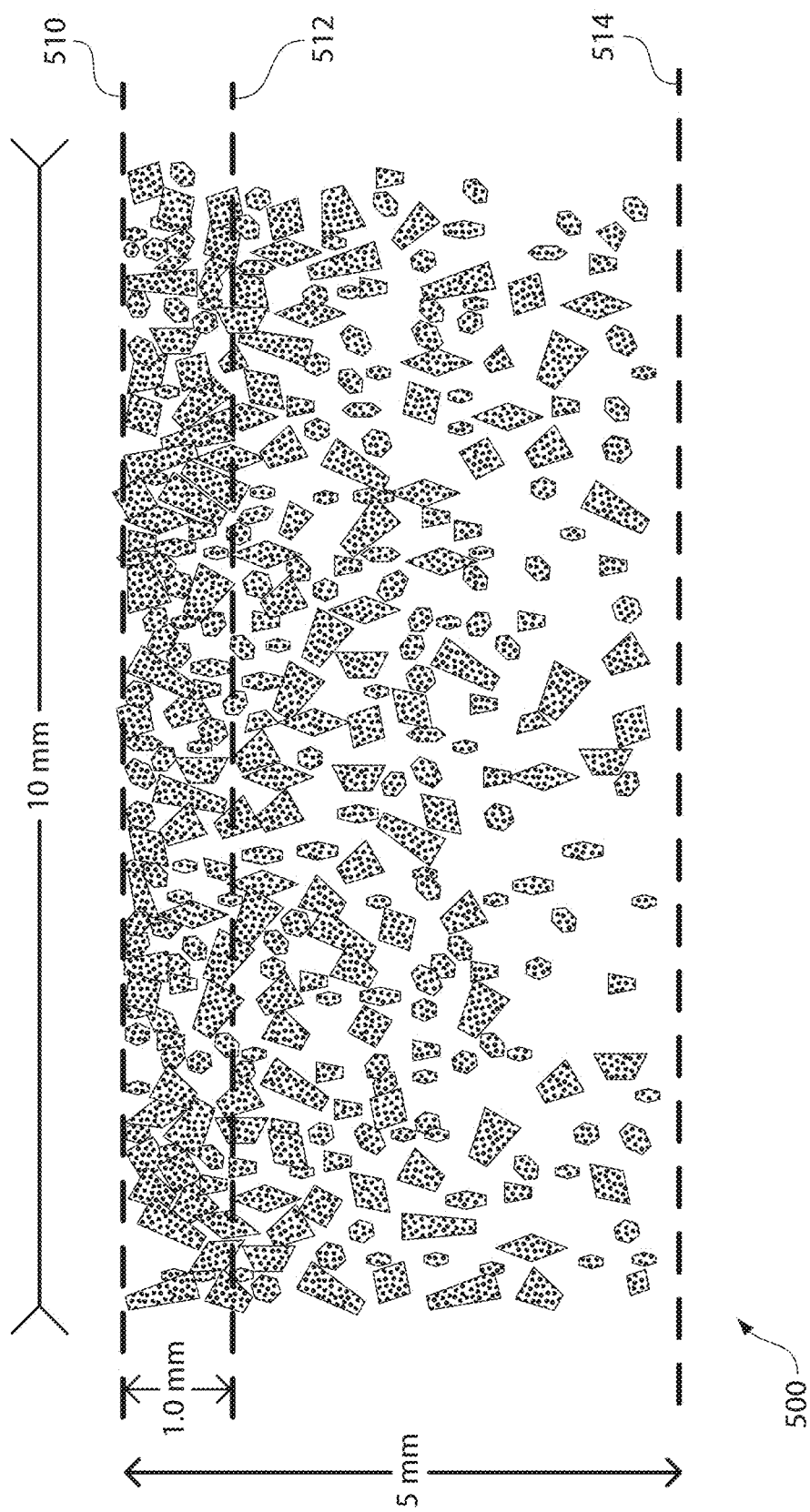
FIG. 3 provides a schematic depiction of a cross section of an aerogel blanket.

Rather than trying to stabilize the aerogel slurry, the processes described herein can be used to destabilize a slurry system and increase separation of particulate material from the solvent system. This can be achieved by coagulating soluble or dispersed compounds in the slurry to form an aerogel floc that may contain additional particles such as fibers and opacifiers. A distinct two phase system can result wherein bodies of aerogel floc are suspended in a supernatant that is essentially free of particulate matter. Within those bodies of floc, different particulates such as aerogel, fibers and opacifiers may be evenly and stably retained. For instance, the cross-sectional drawing of FIG. 2 illustrates the distribution of aerogel particles in a nonwoven blanket made using an embodiment of the methods described herein. The aerogel particles in FIG. 2 are more evenly distributed than in the blanket of FIG. 1, and although the overall concentration of aerogel particles in each of the two blankets is the same, the blanket of FIG. 2 shows a consistent mixture of aerogel particles and fibers throughout the thickness of the blanket. This consistent mixture can provide a uniform structure to the blanket in which the composition of the blanket is substantially homogeneous and there is an absence of discernible strata of any individual materials in the blanket. This can result, for example, in reduced shedding of aerogel particles, improved insulation qualities and more uniform flexibility and strength. In some embodiments, the aerogel particle concentration (by weight) in the upper 10%, 20% or 30% (cross-section) of an aerogel blanket may be within 30%, within 20%, within 10% or within 5% of the overall concentration of aerogel particles in the blanket. The number of particles in each region can be determined by slicing through the thickness of a sample blanket and counting aerogel particles, with the aid of a microscope, across different portions of the cross-section. An embodiment of one such method is illustrated in FIG. 3 that shows cross-section 500 of an aerogel blanket, the cross-section having a height (thickness of the blanket) of 5 mm and a length of 10 mm. The entire cross section is delineated by dashed lines 510 and 514 and the upper 20% of the cross section is delineated by dashed lines 510 and 512. The aerogel particles in the upper 20% region can be counted as well as the total aerogel particles in the entire cross section region. The particles per unit area of cross section for each of the two regions is then calculated and a comparison made between the two values. In an alternative evaluation, instead of using the number of particles, the percentage of the area of the field of view that includes aerogel particles (or alternatively, the absence of aerogel particles) can be compared between the overall cross section and the 20% upper portion of the cross section. This may be facilitated through the use of software to help differentiate aerogel particles from areas that are not aerogel particles. Analogous tests can be used for other blanket components such as fibers, opacifiers and binders.

Two of the methods that can be used to achieve coagulation and flocculation are charge neutralizing and particle bridging. The terms "coagulation" and "flocculation" are used herein as used by those skilled in the art. "Coagulation" typically means neutralizing like charges on particles so that they no longer repel each other and subsequently come together or form aggregates. "Flocculation" entails bridging particles together with a high molecular weight compound so that the bridged compounds form a floc. In various embodiments, nonwoven aerogel blankets can be formed using one or more coagulants, one or more flocculants, or both coagulant(s) and flocculant(s). Coagulation and flocculation can each be used to destabilize an emulsion. Either or both of coagulation and flocculation can result in the formation of a two phase system consisting of a floc and a supernatant.

Aerogel blankets may shed loose particles, some of which can produce aerogel dust. Lower levels of dust production in aerogel blankets may increase the applications for which the blankets are suitable and may, for example, result in blankets that are in compliance with various workplace and environmental standards. Loosely bound particles that are shed from an aerogel blanket can include aerogel, glass, opacity modifiers and binders. Wet laid aerogel blankets with evenly dispersed aerogel, fibers and binder can retain particulate matter to a greater degree than blankets that exhibit segregation of materials across the thickness of the blanket. For instance, blankets having a higher than average (for the entire blanket) concentration of aerogel particles at one surface will, as a result, have less binder in the same region. Therefore, these aerogel particles will be less tightly bound to the blanket than those in the region of the blanket having evenly distributed particles. The less tightly bound particles are more likely to be dislodged from the blanket by abrasion, bending or shock, resulting in the release of particles and possible formation of aerogel dust.

Coverings or coatings on the major surface(s) of a blanket can reduce dust production significantly, but in many uncoated or uncovered aerogel blankets, dust production can result. Loose particle shedding (or dust production) from aerogel blankets (covered or uncovered) can be determined in a number of ways. In one test, a 20 cm by 20 cm aerogel blanket sample is held vertically 10 cm above a solid surface and an edge of the blanket is tapped on the surface three times. The resulting loose particles can be collected, weighed and reported as a percent of the total mass of the blanket sample tested. In a second test protocol, the tendency of an aerogel blanket to shed can be measured by repeatedly bending or flexing a sample of the test blanket and either weighing the particles that settle out or weighing the aerosol particles that remain airborne. In one example, a 20×20 cm test sample is flexed 10 times by repeatedly pushing opposing ends of the blanket together and then pulling them apart to alternately collapse halves of the sample together and flatten the sample out.

Any loose particles that result from a test can be collected and weighed. Particles may be collected off of a surface, from the air, or both. Aerosol (airborne) particles may be quantified gravimetrically by weighing a particulate filter that has trapped aerosol particles or may be measured using aerosol monitors such as a laser photometer. Aerosol particles may be reported independently or as part of the total particulate matter that is shed by the blanket. In some cases, the amount of dust produced may be less than 0.1%, less than 0.01% or less than 0.001% of the blanket sample by weight. Shed particles may also be measured based on the mass of particles produced per unit of blanket surface area. For instance, when various embodiments are evaluated using the test methods described herein, the amount of loose aerogel particles produced per $m^2$ of blanket sample may be less than 1 g, less than 100 mg, less than 10 mg or less than 1 mg. As particulate matter may be shed primarily from an exposed surface of a blanket, the amount of particulate matter produced per unit area may be more informative than the amount of particulate matter produced per unit mass. For instance, an aerogel blanket of 5 mm thickness will often exhibit an amount of particulate production similar to that of an aerogel blanket of the same composition having a thickness of 20 mm.

In some applications, users may be concerned about the size of aerogel and opacifier particles that may be shed by an aerogel blanket. In these cases, the particles may also be analyzed for particle size and particle size distribution. In many embodiments, the aerogel blankets disclosed herein produce very low or non-detectable levels of particles small enough to remain airborne (aerosol particles). For instance, in some embodiments the blankets may shed particles at levels that are non-detectable for sizes smaller than 2.5 µm, smaller than 1 µm, smaller than 0.1 µm, smaller than 0.01 µm, or smaller than 0.001 µm. In other embodiments, the resulting concentration for particles in each of these size ranges in the air may be less than 10 $mg/m^3$, less than 5 $mg/m^3$, less than 3 $mg/m^3$ or less than 1 $mg/m^3$.

Blanket Production—
The Wet Laid Process—

In one set of embodiments a charged compound is combined with an aqueous aerogel slurry to introduce an emulsion into the slurry. After mixing the emulsion, aerogel, fibers, opacifiers and/or any other components together, a destabilizing compound, which may also be a charged compound, may be added to the emulsion to destabilize the system. This destabilizing compound can be a polymer and in some embodiments can be a charged polymer. The addition of the destabilizing compound can coagulate or flocculate the emulsion as the slurry transforms from a consistently milky single phase system into a distinct two phase system that includes one phase of clumpy coagulated masses (floc) and a second supernatant phase. The floc can capture aerogel particles, fibers, opacifiers and any other non-aqueous soluble materials. The supernatant can consist essentially of water and water-soluble compounds although in some cases it may also include traces of particulate material. The supernatant may be significantly clearer than the original slurry and may be reused in some processes. It has been found that the floc (coagulated masses) can retain particles of aerogel and fibers (as well as other materials) when subjected to forces such as capillary and gravity effects. This suspension of particles in a substantially homogeneous state may be primarily a physical phenomenon rather than a chemical one. The floc may float on the supernatant, may sink in the supernatant or may be distributed throughout the supernatant. Regardless of the density of the floc, however, in many embodiments the majority of the floc can be retained on a scrim when the slurry is drained through the scrim. This homogeneous suspension can form a wet laid aerogel blanket that is compositionally consistent across its length, width and/or thickness and does not contain strata having high or low concentrations of any particular material such as aerogel particles, binder or fibers.

Components—
Aerogel Particles—

Any type of aerogel particle(s) can be used to make the nonwoven blankets described herein. Aerogel may comprise the majority of the volume of the blanket and in some embodiments may account for greater than 50%, greater than 75% or greater than 90% of the volume of the blanket. By weight, aerogel may account for greater than 1%, greater than 2%, greater than 10% or greater than 20% of the mass of the blanket. The aerogel particles can be based on metal oxides that are suitable for a sol-gel technique (C. J. Brinker, G. W. Scherer, Sol-Gel Science. 1990, Chaps. 2 and 3), such as Si or Al compounds, or those based on organic substances that are suitable for the sol-gel technique, such as melamine-formaldehyde condensates (U.S. Pat. No. 5,086,085) or resorcinol-formaldehyde condensates (U.S. Pat. No. 4,873,218). Suitable aerogels can be made from waterglass or from organic materials such as TEOS and TMOS. They can also be based on mixtures of the above-mentioned materials. In many embodiments, aerogels containing silicon (Si) compounds and, more preferably, $SiO_2$ are used. To reduce the radiative contribution to thermal conductivity, the aerogel can contain IR opacifiers, such as carbon black, titanium dioxide, iron oxide, silicon carbide, zirconium dioxide, or mixtures thereof.

The aerogels can have any particle size that allows them to form an aqueous slurry. The aerogels can have narrow or wide particle size distributions and can be in the form of comminuted powders or larger chunks. The larger pieces can have a diameter of from about 1 mm to sizes approaching the blanket thickness, and the comminuted aerogels can have an average particle size diameter of 1 mm or less. The large pieces can be in the shape of spheres, although the aerogel chunks can have any shape. The diameter of an aerogel particle is measured along the longest cross sectional line in a given particle. The average aerogel particle diameter may be less than about 4.0 mm, less than about 1.0 mm, less than about 0.5 mm or less than about 0.2 mm. In some embodiments, the range of average particle diameters is 0.01 mm to 1 mm, 0.7 to 1.2 mm, or 0.05 mm to 0.9 mm. In some embodiments, all the aerogel particles may have a diameter of less than 4.0 mm, less than 2.0 mm, less than 1.0 mm or less than 0.5 mm. In other embodiments, the blanket may be essentially free of particles having diameters of greater than 0.2 mm, greater than 0.5 mm, greater than 1.0 mm or greater than 2.0 mm.

A variety of hydrophobic aerogels can be used. Hydrophobic aerogels are those exhibiting a water contact angle of greater than 90 degrees. Examples include, but are not limited to, aerogels commercially available from Cabot Corporation. Particular commercially available types include, but are not limited to, ENOVA® brand aerogels. As the aerogel can be pre-formed prior to the construction of the blanket, any desirable aerogel structure, morphology, or other characteristic can be chosen, and this characteristic can be essentially present in the final product (e.g., blanket).

In one set of embodiments, aerogel particles with porosities of greater than about 60% and densities of less than about 0.4 g/cc can be used. In other embodiments, aerogel particles may have densities of from about 0.05 to about 0.15 g/cc. The thermal conductivity of the aerogel particles can be less than about 40 mW/m° K, less than about 25 mW/m° K, or from about 12 mW/m° K to about 18 mW/m° K, or lower. To reduce flammability, for example, the aerogel particles may be low calorie aerogels, such as those having a caloric content of, for example, less than 10 MJ/Kg, less than 8 MJ/Kg, less than 7 MJ/Kg or less than 6 MJ/Kg.

To aid in water dispersibility, hydrophobic aerogel particles may be treated with, for example, at least one wetting agent, such as at least one surface active agent (e.g., surfactant), and/or at least one dispersant. The dispersant may be selected from ionic (anionic and cationic) surfactants, amphoteric surfactants, nonionic surfactants, high molecular surfactants, and high molecular compounds, for example. The anionic surfactants include alkyl sulfates and higher alkyl ether sulfates, more specifically, ammonium lauryl sulfate, and sodium polyoxyethylene lauryl ether sulfate, for example. The cationic surfactants include aliphatic ammonium salts and amine salts, more specifically, alkyl trimethylammonium, and polyoxyethylene alkyl amine, for example. The amphoteric surfactants may be of betain type, such as alkyl dimethyl betain, or of oxido type, such as alkyl dimethyl amine oxide, for example.

Nonionic surfactants include, for example, glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, polyether-modified polydimethylsiloxanes such as BYK 301, BYK 302, BYK 3455, BYK 349 (BYK-Chemie GmbH), and others. In some embodiments, the surfactant may have a boiling point of less than 200° C., 150° C., 140° C. or 120° C.

Examples of wetting agents that can be used include AEROSOL OT (sodium di-2-ethylhexylsulfosuccinite), BARLOX 12i (a branched alkyldimethylamine oxide), TRITON 100 (octylphenoxypolyethoxy(9-10)ethanol), TWEEN surfactants like TWEEN 100 surfactant, and BASF pluronic surfactants. Other examples of wetting agents include glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof. Wetting agents may be capable of volatilizing during the drying and/or hot calendaring to allow suitable recovery of the hydrophobicity of the hydrophobic aerogel particles. If the wetting agent remains on the surface of the aerogel particles, the remaining wetting agent can contribute to the overall thermal conductivity of the composite material. Thus, in some embodiments, the wetting agent can be one that is removable, such as by volatilization with or without decomposition or other means. For example, the wetting agent(s) may have a boiling point of less than 200° C., 150° C., 140° C. or 120° C. In some embodiments, the amount of wetting agent used may be about 0.6 parts by wt. or less wetting agent to about 1 part aerogel by wt. In other embodiments, the amount of wetting agent used can be about 0.05 parts to about 0.5 parts by weight wetting agent to about 1 part by weight aerogel.

In one aspect, the aerogels may be translucent. Translucent aerogels that also provide good insulative properties may be useful in applications such as daylighting and insulated glass units (IGU). Measuring light transmission through a monolith can be done using methods known to those of skill in the art, but when light transmission is measured through an aerogel particle, the particle size can affect the amount of light detected due to differences in scattering caused by the surface of the particle. Thus, different sized aerogel particles may provide different values for translucency (light transmission or lack of absorption) even when the particles are of the same material. Therefore, translucency values for the aerogels described herein will typically be provided based on a specific particle size range. For purposes of comparison, translucency values can be provided for a specific range of aerogel particle sizes and a specific light wavelength or range of wavelengths in combination with a standard observer. For instance, translucency may be measured for particles over specific diameter ranges, such as less than 0.01 mm, 0.01 to 0.1 mm, 0.1 to 0.3 mm, 0.3 to 0.8 mm, 0.8 to 2.0 mm or 2.0 to 4.0 mm. The following procedure is one method that may be used to measure the translucency of a granular aerogel of a specific particle size.

To measure the translucency of aerogel particles in a specific particle size range the regular transmitted lightness of a sample can be detected on a spectrophotometer and expressed as the $L^*$ value from the tristimulus CIE $L^*,a^*,b^*$ color scale. The $L^*$-axis is calibrated prior to measurement with a black standard ($=0$) and an empty sample cell as white standard ($=100$). For sample preparation, the aerogel particles are compacted with 1750 taps on a Jel STAV 2003 jolting volumeter into a vitreous sample holder (10×10×2 cm). In a Hunter Lab Ultra Scan XE spectrophotometer the sample is illuminated in diffuse/8° geometry by a light source with D65 spectrum. Regular transmittance (RTRAN) through the sample is detected on 30 different positions of the sample cell. $L^*$ values are calculated from the collected data points by applying a 10° standard observer, and the values are averaged. Using this method, the silica aerogel particles used herein may exhibit average $L^*$ values, for particles from 1.2 to 4.0 mm, of greater than 22, greater than 23, greater than 24, greater than 25, greater than 26, greater than 27, greater than 28, greater than 29, greater than 30, greater than 35 or greater than 50.

Fibers—

In one set of embodiments an aerogel blanket may include aerogel particles and one or more types of fiber. Fibers can provide strength, can reduce flammability, and can help to bind and retain aerogel particles in a blanket. Fibers may comprise, by weight, greater than 1%, greater than 3%, greater than 5% or greater than 10% of the aerogel blanket. In other embodiments fibers may account for less than 5%, less than 3% or less than 1% of the weight of the blanket. The fibers can be natural fibers, synthetic fibers, or both. Glass fibers and ceramic fibers may be used. Fibers may be of consistent length or may include fibers of mixed length. One or more thermoplastic fibrous materials may be included with which the aerogel particles and fibers can be connected in such a way that the thermoplastic fibers at the surface are fused and, on cooling, result in a joining of the fibers to each other, to the aerogel particles and to any other particles that have been included in the blanket. Cross-linkable polymers may also be used to join particles in the blanket and the polymers may be thermally activated. Thermal consolidation can provide a stable fibrous formation that immobilizes the aerogel particles with respect to each other, providing a stable fiber/aerogel matrix. Examples of thermoplastic fibers include polyolefin fibers, polyamide fibers, or polyester fibers. In other embodiments, polymeric fibers can be used, such as polyethylene fibers, which can be obtained from Mini-Fibers; and short-cut bicomponent fibers, that are available from Invista.

Glass and ceramic fibers that can be used in a blanket may be comprised of a variety of inorganic oxides, such as $SiO_2$, $Al_2O_3$, $B_2O_3$, $Na_2O$, $K_2O$, CaO and MgO. Specific fibers may include one, two, three, four or more of these oxides. In some embodiments, fibers may be glass fibers such as borosilicate (B Fiber) and calcium aluminoborosilicate (E Fiber), which can be obtained, for example, from Lauscha Fiber International; fibers that consist essentially of silica (Q fibers), which can be obtained, for example, from Johns Manville. Other types of fibers that can be used in certain embodiments are, mineral, synthetically made non-carbon fiber, mineral wool, wollastonite, ceramic, cellulose, cotton, polyvinyl alcohol (PVA), polybenzimidazole, polyaramid, acrylic, phenolic, polypropylene, other types of polyolefins, or organic fibers, such as aramid fibers or nylon fibers. The fibers can also be coated, such as polyester fibers metallized with a metal such as aluminum. In certain embodiments, the aerogel particles or the fibers can be translucent fibers. As used herein, the term "translucent" means that at least a minimum amount of light is transmitted, though scattered, through the particle or fiber.

The length and diameter of the fibers can vary with specific applications. In some embodiments, the diameter of the fibers can be smaller than the mean diameter of the aerogel particles, so that, for example, a high proportion of aerogel can be bound into the blanket. Smaller diameter fibers can provide adequate strength while allowing more aerogel particles to be used, resulting in reduced thermal conductivity. In some embodiments, fibers may have diameters of less than about 20 microns, less than 10 microns, less than 5 microns, less than 2 microns, less than 1 micron, less than 0.7 microns or less than 0.5 microns. (e.g., from about 1 micron to about 18 microns or about 1 micron to 10 microns) and have lengths that are greater than the aerogel particle diameter (e.g., from about 200 microns to about 5,000 microns or 200 microns to 1,000 microns). In other embodiments, fibers can have a length to width ratio of greater than 50:1, greater than 100:1, greater than 300:1 or greater than 500:1. Lengths of fibers used in specific embodiments of the aerogel blankets can be less than 1 cm, less than 5 mm, less than 1 mm, less than 0.5 mm or less than 0.25 mm. Fibers may also have lengths greater than 0.1 mm, greater than 0.5 mm, greater than 1 mm, greater than 2.5 mm or greater than 5 mm. In some cases, the majority (>50%) of the fibers have a length of less than 3 cm, less than 2 cm, less than 1 cm or less than 5 mm. The individual fiber denier of the fibers can be selected within very wide limits. In some embodiments, the fiber denier can be below about 16 dtex, and, more preferably, below about 6 dtex. In some specific embodiments, fibers are bicomponent fibers of deniers below 4 and cut lengths in excess of 4 mm. In some embodiments, two or more different types of fiber can be used so that the length distribution of fibers exhibits a bimodal or multimodal distribution. For example, one embodiment of an aerogel blanket can include 80% microfiber having an average length of 0.75 mm and 20% of glass fibers having an average length of 6 mm. The distribution of lengths of these fibers would be bimodal with peaks at 0.75 mm and 6 mm.

The fibers can have any shape in cross section. The fibers can be round, polygonal, trilobal, pentalobal, octalobal, in the form of strips, or be shaped like fir trees, dumb bells, or otherwise. Fibers may have consistent or varying diameters along the length of the fiber. Hollow fibers can be used in some embodiments. Additionally, the fiber materials can be smooth or crimped and may be curled or straight. In certain embodiments the fibers can be modified by additives; for example, anti-static agents such as carbon black. The fibers can also contain IR opacifiers, such as carbon black, titanium dioxide, iron oxide, or zirconium dioxide, silicon carbide, as well as mixtures of these, in order to reduce the radiation contribution to thermal conductivity. The fibers may also be dyed to provide color.

In addition to including IR opacifiers, the radiation contribution to the thermal conductivity can be further reduced by using blackened fibers, such as polyester fibers blackened with carbon black or simply carbon fibers. Carbon black can also be added to the composition. The mechanical strength of the article obtained after drying can also be influenced by the length and distribution of the fibers in the composition. In order to reduce the increase in thermal conductivity caused by the added fibers, the proportion (by weight) of the fibers can be maintained at the lowest concentration required to achieve the desired blanket strength. The amount of fiber used depends on its density, diameter, length and, especially, its bonding properties and can be from about 15% to about 70% by weight and, preferably, from about 20% to about 60% by weight. The thermal conductivity of the fibers can be from about 0.1 to about 1 W/m° K and, preferably, less than about 1 W/m° K.

In some embodiments, the fibers used may exhibit low shrinkage rates at high temperatures. For instance, at 650° C., the glass fibers may exhibit shrinkage (ASTM D336) of less than 5%, less than 4%, less than 2%, less than 1% or less than 0.5%. These low shrinkage rates can help retain the integrity of the blanket under high temperature operating conditions. This can result in less aerogel dust, lower thermal conductivity, and a more durable aerogel blanket.

Additives—

Opacifiers, such as infrared opacifiers, can be added to the aerogel slurry to reduce radiative heat transfer in an aerogel blanket. IR opacifiers are materials that reduce the transmission of infrared radiation and include, for example, carbon black, titanium dioxide, rutile sand, iron oxide, silicon carbide (SiC), graphite or zirconium dioxide. Different types of suitable titanium dioxide include, for example, Tipure® (DuPont) and Altiris® (Huntsman). IR opacifiers may be used individually or as mixtures of two or more compounds. Opacifiers may be added to the aerogel slurry as dispersions and in some embodiments can be mixed in at any point in the process prior to flocculation. IR opacifiers can be added in amounts that provide a target level of IR transmission reduction in the blanket. These levels may be, for example, from 2% to 150%, 2% to 100% or 5% to 40% opacifier based on the weight of aerogel in a dried aerogel blanket. Opacifier particle sizes may range, for example, from 500 nm to 6 micron, 1 micron to 4 micron, or 2 micron to 4 micron. Two or more different average particle size opacifiers may be used in a single embodiment to cover a broader range of IR wavelengths.

In some embodiments the aerogel blanket can include a flame or fire retardant. Concentrations of fire and/or flame retardant in some embodiments may range, by weight, from 0.1% to 5.0%, 0.2% to 2.0%, and 0.3% to 1.5%. Flame retardants may be, for example, alkali oxides, alkali earth metal oxides, aluminum trihydrate, magnesium hydroxide, antimony oxides, titanium dioxide, rutile sand, melamine compounds, phosphate based or halogen based compounds. In specific embodiments, titanium dioxide particles may have a diameter of about 1.18 µm, from 0.9 to 1.3 µm, from 0.8 to 1.4 µm or from 0.5 to 4.0 µm, and in certain embodiments the particle size distribution may have a $d_{50}$ of about 1.0 µm+/− 0.01 µm, +/−0.02 µm or +/−0.05 µm. Halogenated flame retardants include, for example, brominated flame retardants (BFR) such as organobromide compounds including polymeric organobromide compounds. In some embodiments, flame retardants that raise the pH of the slurry, or don't lower the pH of the slurry, may be used. These include brominated flame retardants, for example. In another set of embodiments, the flame retardant has a structure with a high ratio of heteroatoms to carbon atoms. For example, in some blanket embodiments the ratio of heteroatoms to carbon atoms may be greater than 0.5 to 1, greater than 1 to 1, or greater than 2 to 1, and in specific embodiments the heteroatoms may be nitrogen and/or sulfur. Flame and/or fire retardants can be incorporated into a blanket in concentrations adequate to suppress flammability or to meet industrial specifications such as ASTM E84 for flame and smoke, and 1354 for flammability (cone calorimetry). For example, the flame spread index for aerogel blankets disclosed herein may be less than 25, less than 20, less than 15, less than 10, less than 5 or 0 using ASTM E84. Similarly, results for the smoke developed index under ASTM E84 may be less than 450, less than 100, less than 15, less than 10, less than 5 or may be 0. Some of the embodiments qualify as "Class A" under ASTM E84 meaning that they have a flame spread index of 0-25 and a smoke developed index of 0-450. Using ASTM method E1354 (cone calorimetry), at an incident heat flux equivalent of 50 kW/m$^2$ some embodiments of the aerogel blankets may provide a peak heat release rate of less than 20 kW/m$^2$, less than 18 kW/m$^2$ or less than 17 kW/m$^2$. When aerogel blankets are installed on a hot surface, it may be useful to minimize or eliminate any exothermic reactions that may occur in the blanket. Using a test such as ASTM Method C411, the hot surface performance of many embodiments of the aerogel blankets described herein may indicate that the blankets can be used in extreme hot surface applications. For example, at 650° C., the resulting exotherm in some embodiments may be less than 100° C., less than 50° C. or less than 25° C. above process temperature. Embodiments of wet laid aerogel blankets may exhibit caloric content of, for example, less than 20 MJ/Kg, less than 15 MJ/Kg, less than 12 MJ/Kg, less than 10 MJ/Kg, less than 8 MJ/Kg, less than 6 MJ/Kg, less than 4 MJ/Kg or less than 3 MJ/Kg.

Charged Compounds—

In one set of embodiments the charged compound can be any compound or mixture of compounds that can form an emulsion in an aqueous system. The charged compound may be, for example, cationic, anionic or amphiphilic. In many embodiments, the charged compound is a binder that can retain particles together in the finished aerogel blanket. In some embodiments the charged compound can be a polymer such as an emulsion polymer (latex). For instance, a water soluble or waterborne polymer can be mixed into an aerogel slurry to form a milky dispersion (emulsion) of aerogel particles and emulsified polymer. As used herein, polymers are organic compounds composed of repeating units and having a molecular weight of greater than 5,000. A polymer is considered to be water soluble if it is soluble in pH 7 water at 25° C. in a concentration greater than 1% by weight. A waterborne polymer may be capable of forming an emulsion (latex) in an aqueous system and may also be incorporated into the aerogel blanket after dewatering. Additional suitable charged compounds include, for example, natural and synthetic latex polymers, starches, colloidal metal oxides such as fumed silica and fumed alumina, and water glass. Polymers include homopolymers and heteropolymers and can comprise one, two, three or more repeating monomer units. Examples include, for instance, polyvinyl alcohol (PVA), acrylics such as butyl, ethyl, styrene and vinyl acrylics (e.g., Dow Aquaset®); polyurethanes; silicones, acrylabmides, alkenes including dienes such as styrene butadiene; gelatins, polysaccharides such as corn starch and cyclodextrin. Specific embodiments may use one, two, three or more different types of charged compound. Average molecular weights of these compounds can be, for instance, greater than 5,000, greater than 10,000, less than 500,000, less than 1,000,000, from 10,000 to 1,000,000; from 20,000 to 500,000; or from 50,000 to 500,000. In some embodiments, the charge density of a charged compound may be from 0.2 meq/g to 10 meq/g, 0.5 meq/g to 10 meq/g, 1 meq/g to 8 meq/g, 2 meq/g to 8 meq/g or 3 meq/g to 7 meq/g. The amount of charged compound added to the aqueous system can vary and on a wt/wt basis of charged compound/water may be in ratios of greater than 1:10, greater than 1:100, greater than 1:1000 or greater than 1:10,000. On a wt/wt basis of charged compound/aerogel, the ratios may be greater than 1:100, greater than 1:10, greater than 1:1, greater than 10:1 or greater than 100:1. The emulsion may be stable for extended periods or the slurry may be agitated to retain a homogeneous system. The emulsion may be formed before or after the insoluble aerogels and other insoluble particulate materials are added into the slurry.

Destabilizing Compounds—

To prepare an aerogel slurry for dewatering and blanket formation, the emulsion can be destabilized to allow coagulation and/or flocculation. In some embodiments, a destabilizing compound can be added to bring about coagulation and/or flocculation. A destabilization compound can be any compound that causes an emulsion to break and results in the formation of a coagulant or floc that retains the bulk of the aerogel and any fibers that are present. The floc may include, for example, a matrix of polymers capable of retaining and supporting aerogel particles and fibers in an aqueous system. In one set of embodiments, water soluble ionic polymers can be used to destabilize the system. The polymer may be incorporated into the aerogel blanket and thus polymers compatible with the anticipated end use of the blanket can be selected. In various embodiments, these polymers may have molecular weights of, for instance, greater than 5,000, greater than 10,000, greater than 100,000; less than 500,000, less than 1,000,000, less than 50,000,000; from 10,000 to 1,000,000; from 20,000 to 500,000, 20,000 to 1,000,000 from 50,000 to 500,000, from 1,000,000 to 10,000,000, or from 1,000,000 to 60,000,000. When the charged compound is anionically charged, the destabilizing compound can be a cationic polymer such as a polyamine based polymer system. This system may be used, for example, when the aerogel particles exhibit a net negative charge. In some embodiments, when the charged compound is cationically charged, the destabilizing material can be an anionic polymer. Destabilizing compounds may exhibit high charge densities and may have, for example, charge densities greater than 1 meq/g, greater than 2 meq/g, greater than 4 meq/g, greater than 5 meq/g, or greater than 6 meq/g. Examples of destabilizing polymers include quaternary polyamines such as polyamine and polyacrylamide; dicyandiamide resins; polydiallyldimethylammonium chloride (polyDADMAC),\; amino silanes; quaternary amine functionalized sialnes; and silicone resins (or their emulsion forms). Polymers that contribute the least to flammability, such as polyamines, may be used in applications where flammability is to be minimized. Non-polymeric coagulants include, for example, aluminum compounds such as colloidal alumina, aluminum sulfate, polyaluminum silica sulfate, polyaluminum chloride, aluminum chlorohydrate, sodium aluminate and iron compounds such as ferric sulfate, ferrous sulfate, ferric chloride, ferrous chloride and ferric chloride sulfate.

In some embodiments, the amount of destabilizing material added may be the same on an equivalents basis as the amount of the charged compound that is present. The amount of destabilizing agent may be calculated on an equivalents (normality) basis that neutralizes or exceeds the total charge on the charged compound and other similarly charged compounds in the slurry. In other embodiments, the amount of destabilizing agent may be chosen by determining or measuring the zeta potential of the dispersed particles in the slurry and adding a quantity of destabilizing agent sufficient to reduce the absolute zeta potential to a level that promotes particle agglomeration. In other cases, for instance when a bridging mechanism is used, the amount of destabilizing material need not be stoichiometric and may be provided in an amount (equivalents basis) greater than, equal to, or less than the equivalents of the first charged polymer. As the resulting coagulation/flocculation process is often visibly observable, in some cases the optimal amount of destabilizing material can be determined empirically, by adding the material until visible flocculation occurs. Coagulation and/or flocculation (destabilization) may also be achieved using methods that don't include directly adding a flocculant or coagulant. For example, coagulation or flocculation may be achieved by altering (raising or lowering) the pH of the system.

Once coagulation/flocculation has occurred, greater than 99% of the particles, including aerogel particles and fibers, can be retained by the floc. In many embodiments, additional mixing or agitation is not required. Often, the floc is of lower density than the supernatant, and the floc floats at or near the surface of the water. In other embodiments, the floc may be denser or of similar density to the supernatant. In many cases, the floc is separable from the supernatant and can be isolated from the supernatant to form a nonwoven wet laid aerogel blanket.

Process—

In one aspect, the aerogel blankets described herein can be made using an aqueous based nonwoven, or wet laid, process. Any or all of the process steps can proceed at room temperature and atmospheric pressure. Aerogel particles, fibers and charged compound are mixed together in water. In many embodiments the components may be mixed together in any order. After the particles have been dispersed and the emulsion formed, the emulsion is destabilized to coagulate, or flocculate, the aerogel, fibers, charged compound, and destabilizing agent into a viscous mass while leaving a clear, less viscous, aqueous supernatant. The floc can then be separated from the supernatant by, for example, draining the supernatant through a scrim, or by removing the floc from the supernatant on a moving belt. The floc can then be dewatered and heated. Post processing such as calendaring may follow. One embodiment of such as process is shown in the flow chart of FIG. 4 and is described below.

Fiber Introduction—In one set of embodiments, fibers are introduced into the aerogel slurry. Fibers may be any of those described herein or known to those of skill in the art. Mixtures of different fibers may be used, such as 60% polymeric fiber and 40% glass fiber or 80% polymeric fiber and 20% glass fiber. Fibers may be pre-dispersed in water, and dispersion may be enhanced with the addition of wetting aids, surfactants, acids, bases and/or defoamers. The dispersed fibers may be added to a mixing vessel before, after, or simultaneously with the aerogel particles.

Aerogel Particle Dispersion—The aerogel particles can be combined with water in a blender or other container and, optionally, with a viscosity modifier, a wetting agent, and a defoamer. The mixture may optionally be blended. One or more opacifiers, such as silicon carbide, can be added to the aerogel mixture. The aerogel/opacifier mixture can then be added to the mixing chamber containing the fibers to form an aerogel slurry. As stated above, any components including fibers, aerogel, opacifiers, fire retardants, dyes, pigments etc. may be added in any order to the mixing chamber, or the components may be added simultaneously.

Emulsifier Addition—A charged compound, which may be a binder capable of forming an aqueous emulsion, can be added to the mixing chamber as a solid, liquid or a dispersion. The charged compound may be a waterborne polymer such as, for example, acrylic silicone or polyurethane. The charged compound can be mixed into the aqueous mixture in the mixing chamber until a milky emulsion is evenly distributed throughout the mixing chamber. The slurry containing water, aerogel, fibers and charged compound may appear opaque and homogeneous. The slurry may be mixed to aid in preventing separation of components. In different embodiments, the pH of the aerogel slurry can vary over a range, and different flocs can be formed in basic, neutral and acidic systems. In one set of embodiments, the slurry can have a pH of 5.0 to 10.0, 6.0 to 9.0, 6.0 to 8.0, 6.0 to 7.0, 5.0 to 7.0 or 5.0 to 8.0. The slurry can be buffered, for example with a phosphate buffer, to maintain a predetermined pH in a range of +/−0.1, +/−0.2 or +/−0.3 pH units. The predetermined pH can be, for example, 6.0 or 7.0.

Destabilization—To form a floc from the slurry, a destabilizing compound such as a flocculant, coagulant, or both, can be added. In one set of embodiments, the destabilizing compound is positively charged when the charged compound is negatively charged. In another set of embodiments, the destabilizing compound can be negatively charged when the charged compound is positively charged. In another set of embodiments, a neutral or uncharged flocculant can be used as the destabilizing compound and the binder may be positively charged, negatively charged or neutral. For example, the destabilizing compound may be a cationic polyamine coagulant when the charged compound is an anionic compound. In differing embodiments the destabilizing compound can be added as a mixture, a dispersion, a solution or a solid. The destabilizing compound can be added while the slurry is being mixed to help disperse the destabilizing compound throughout the slurry.

Dewatering—

Figure 5:
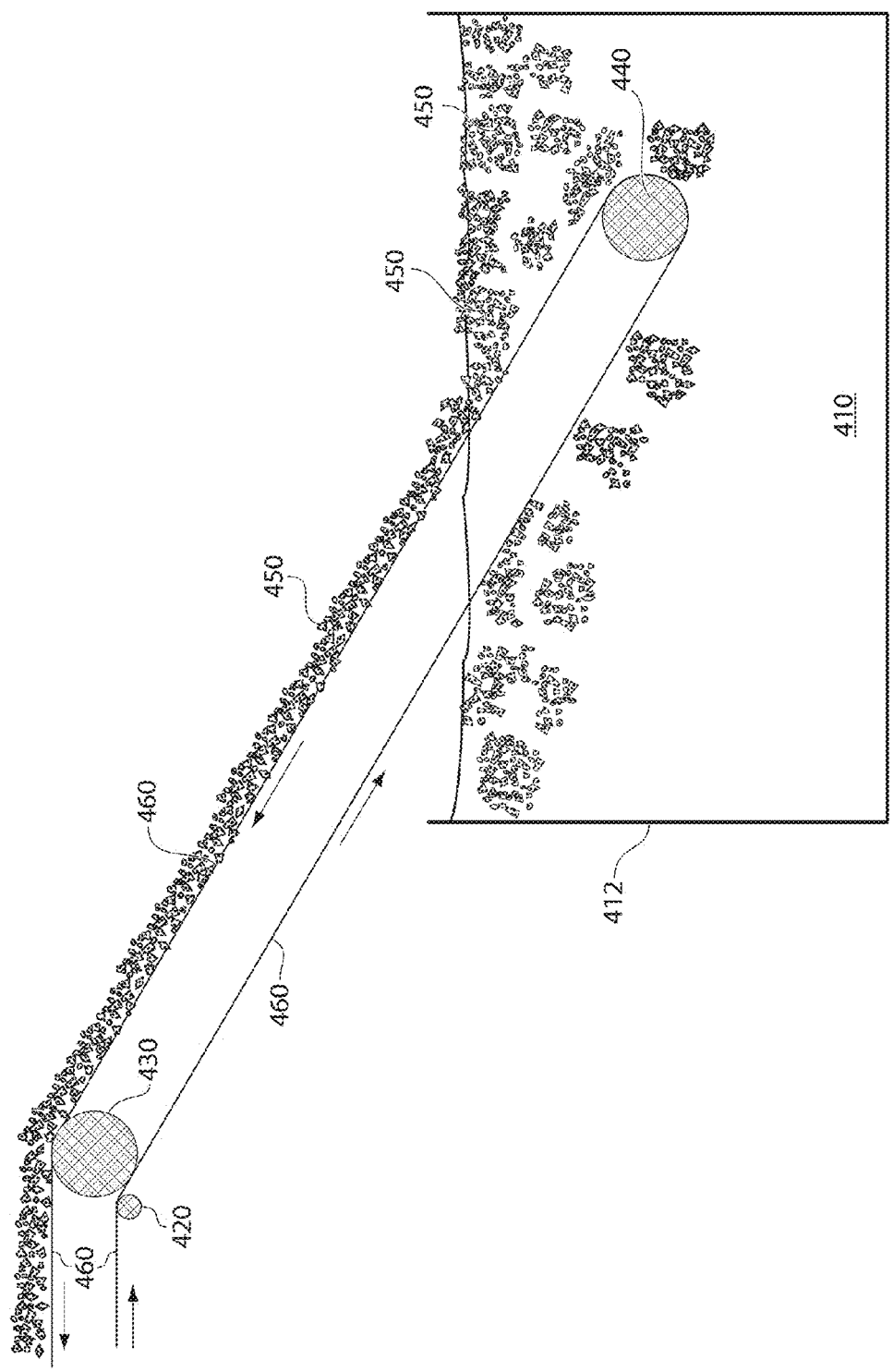
FIG. 5 provides a schematic description of a cross section of one embodiment of a system producing a nonwoven wet laid aerogel blanket from an aerogel floc.

In many embodiments, flocculated aerogel can be separated from the aqueous supernatant in order to form an aerogel blanket. Water can be separated from the aerogel using processes such as evaporation or centrifugation, but in many cases the phases can be separated using filtration. Water and floc can be filtered using materials that permit the transport of water while retaining the floc. These materials can include, for example, scrims, screens, filters, webs, paper and fabrics. Scrims may be of various mesh sizes such as, for example, 5×5 per inch, 10×10 per inch or 20×20 per inch. In some embodiments, a scrim can be drawn through the mixture, or the mixture can be poured or drained through the scrim. In many embodiments, the scrim can be made of glass, polymer, metal or some combination thereof. Any pieces of floc can be of sufficient viscosity and size that they do not readily pass through the scrim while water does. In some cases, the separation process can be accelerated by pressure or vacuum. In another set of embodiments, a scrim belt can be fed into the mixing tank on a continuous or intermittent basis to attach to floc globules and lift them from the supernatant. The scrim may be advanced and supported by a conveyor belt or can be advanced, for example, by a set of rollers as shown in FIG. 5. In some embodiments, the scrim may remain part of the blanket, and additional scrim may be added to one or both sides of the blanket to provide, for example, structural support or other physical or mechanical attributes.

In the embodiment shown in FIG. 5, a scrim 460 can be fed into slurry tank 412 via rollers 420, 430 and 440. As the scrim passes around roller 440, aerogel floc 450 that has accumulated at or near the surface contacts the scrim and is retained by it. As the scrim continues its upward path, the aerogel floc is lifted from slurry tank 412 and removed from supernatant 410. As the scrim passes upwardly and out of slurry tank 412, aerogel floc can be retained on the scrim while water passes through the scrim or flows away from the floc as the scrim lifts the floc from the surface of the water. By adjusting the speed of the rollers, the amount of floc that accumulates on the scrim can be adjusted to achieve a predetermined aerogel floc thickness on the scrim. A conveyor system can be used in batch or continuous process systems. In some embodiments the water can be recovered and optionally used to produce additional batches of aerogel floc.

Drying—

After the aerogel floc has been dewatered, it may still retain significant amounts of moisture. This moisture can be removed by a number of methods including, for instance, air drying or heating. In some embodiments, water can be reduced or removed by rinsing with a volatile, water miscible solvent, such as an alcohol, and evaporating or otherwise removing excess solvent from the blanket. In alternative embodiments, blankets can be dried using heated and/or dried air or other gases, infrared radiation, steam heated rollers, microwaves, RF dryers or electrical resistance based heaters. In some embodiments the drying process can volatilize or decompose any wetting agent that is present so that the aerogel recovers its hydrophobicity and loses hygroscopicity that might cause the aerogel or blanket to absorb moisture. Heat and/or radiation may also be used to bind the components of the nonwoven blanket together. For instance, heat and/or pressure may be applied to fuse or sinter a binder to other binders or to particles such as aerogel and/or fibers. Fibers may be softened or melted at high temperatures and then allowed to cool to thermally bond a matrix that helps to retain aerogel particles and fibers in a blanket that can be handled and manipulated without loss of integrity. In some embodiments, polymeric binders can be activated by heat and/or radiation to reversibly or irreversibly bind aerogel particles and fibers together in the blanket.

In some cases, a nonwoven blanket can be calendared, such as with a hot calendar roll. Calendaring can be used for thermal bonding and can change, for example, the thickness, density, flexibility and surface properties of an aerogel blanket. For example, a nonwoven blanket made with PVA as the charged polymer can be stiff after drying but rendered flexible enough by calendaring that it can be used to wrap pipes, for example, without cracking, shedding aerogel dust, or otherwise losing its integrity. Calendaring may also increase the density of an aerogel blanket and may be used, for example, to improve crush strength.

Nonwoven wet laid aerogel blankets can be joined, adhered or laminated to other materials to form composites than can exhibit different properties. Individual aerogel blankets can be joined together to form composite blankets having 2×, 3×, 4× or more the thickness of a single blanket. Blankets may be joined together using any appropriate technique such as an adhesive or by calendaring the blankets under heat and/or pressure to activate binders, e.g., thermal binders, in the blankets. In other embodiments, cover materials can be attached to the blanket to provide, for instance, dust retention, reflectivity, strength or impermeability. These materials can include, for example, vapor barriers, glass scrim, woven glass mat, nonwoven glass mat, metal foil (aluminum, for example) and polymeric sheets. These materials can be bound directly to the blanket, can be attached on one or both major surfaces using an adhesive, for example, or can be deposited directly onto a surface of an aerogel blanket, using, for example, vapor deposition or extrusion. The cover materials may cover an entire surface or may only cover a portion of the aerogel blanket surface and may be in the form of a pattern. These cover materials typically account for less than 10%, less than 5%, less than 2% or less than 1% of the total thickness of the blanket composite.

EXAMPLES

Example A

Figure 4:
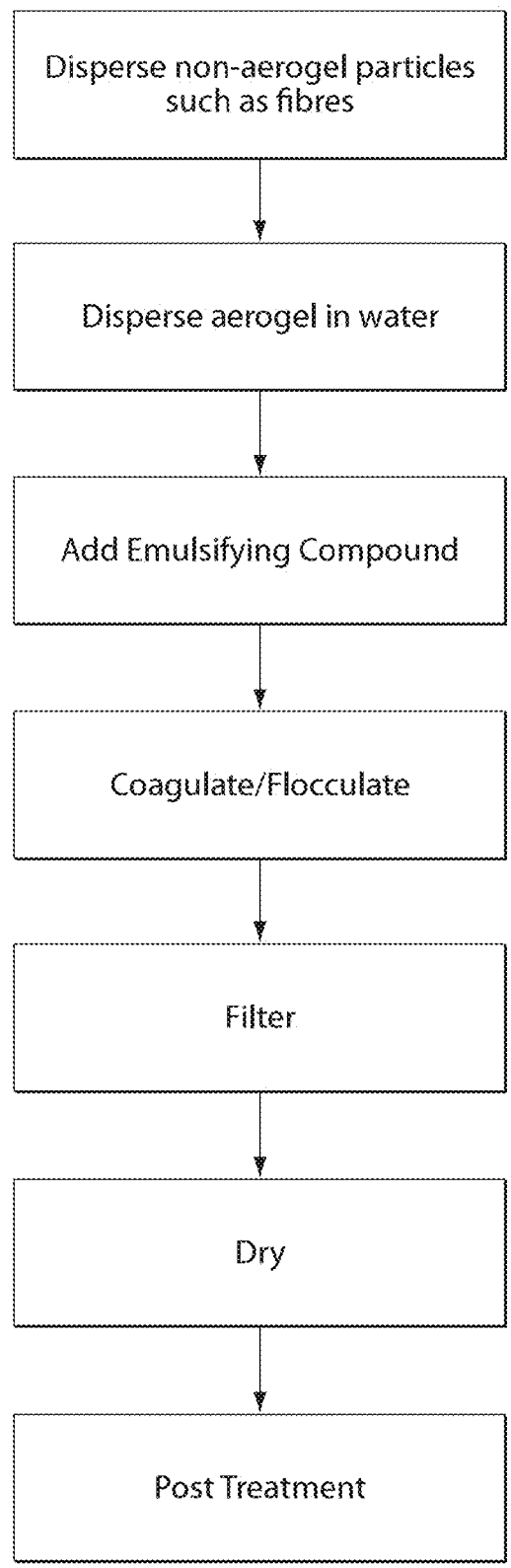
FIG. 4 provides a flow chart showing one embodiment of a method of making a nonwoven wet laid aerogel blanket.

Using a slurry tank similar to that of FIG. 4, a nonwoven, wet laid aerogel blanket was produced using the following materials and processes. A polyester laid scrim (5×5 per inch, SG Adfors Dewtex) was placed in the bottom of a mixing tank and the tank was filled with 24 liters of tap water. In a separate blender (Waring® model CB 10B), 12 g of Microfiber B-06 borosilicate glass fibers (Lauscha) were mixed with 3 g of Barlox® 12 wetting agent (lauryl dimethyl amine oxide) and 3 g of Foamkill® 830F silicone defoamer, and the blender was filled ⅔ full (x liters) with tap water. The mixture was blended at low rpm for 40 seconds and added to the mixing tank. Aerogel particles were prepared by mixing, in a blender, 25 g P 200 aerogel particles (Cabot Corp) having an average particle size of 1 mm with 6 g of Nalco® 7768 viscosity modifier (anionic polyacrylamide), 3 g of Barlox 12i wetting agent and 3 g Foamkill 830F defoamer. Enough water was added to the blender to fill it about ⅔ full and the mixture was blended at low rpm for 15 seconds. 12 g of an IR opacifier, titanium dioxide (0.8 to 3 µm rutile sand) was then added to the same blender and the entire mixture was blended for 30 seconds at low rpm. The resulting aerogel/opacifier dispersion was then added to the mixing tank. Next, a charged compound that also acts as a binder was added to the dispersion of fibers and aerogel by adding 50 g of Novacryl® PSR 300 acrylic polymer latex to the mixing tank. The entire slurry was mixed well for one minute and a milky white emulsion was clearly present throughout the slurry tank. To destabilize the system, a polyamine coagulant, SuperFloc® c 573 (Kemira) was added to the mixing tank dropwise until clear supernatant was visible in the corners of the mixing tank. This occurred after about 3 g of coagulant had been added to the slurry emulsion. After flocculation, a drain at the bottom of the mixing tank was opened, allowing the supernatant to drain through the scrim. The great majority of floc was retained by the scrim and was evenly distributed across it. The scrim was then passed over vacuum to remove additional water from the aerogel floc. A wire roller was then rolled over the upper surface of the floc/scrim to soften irregularities and smooth the surface. The blanket was placed in a drying oven at 150° C. for one hour until the blanket was dry to the touch but was not brittle. The resulting blanket had a thickness of 8 mm and a density of 0.128 g/cc. A copy of a photograph of the aerogel blanket is provided in FIG. 5.

Control Example B

Figure 7:
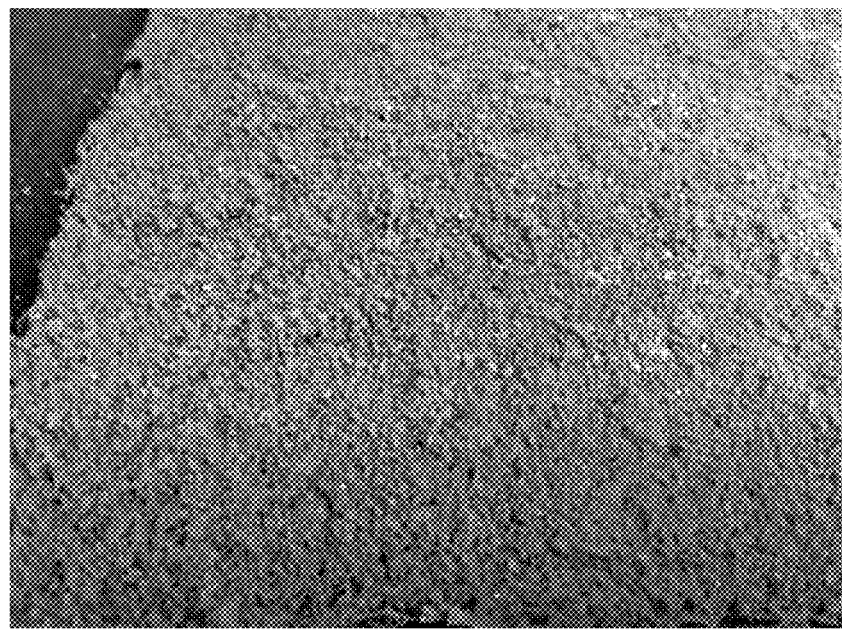
FIG. 7 is a copy of a photograph of an aerogel blanket made using known methods.

A second aerogel blanket was made using the process described in U.S. Pat. No. 7,635,411. The materials and amounts of aerogel, fiber, opacifier, wetting agent, defoamer, charged agent and water that were used were identical to those used in Example A. No coagulant or flocculant was added to the slurry and therefore no floc was formed. The slurry was mixed well and drained through a scrim as in Example A. The blanket was then rolled and dried as in Example A. A copy of a photograph of the resulting aerogel blanket is provided in FIG. 7.

RESULTS

Figure 6:
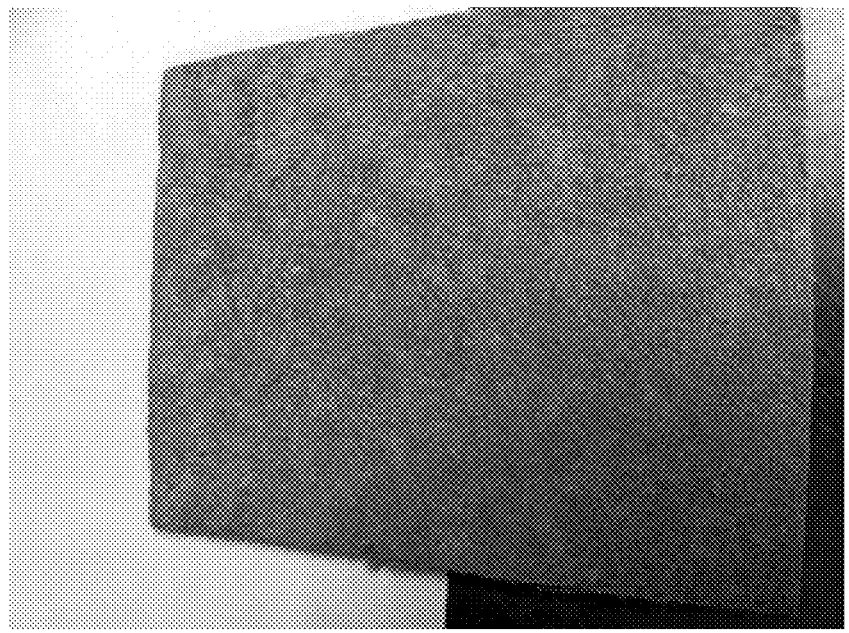
FIG. 6 is a copy of a photograph of one embodiment of an aerogel blanket made using the processes described herein.
Figure 8:
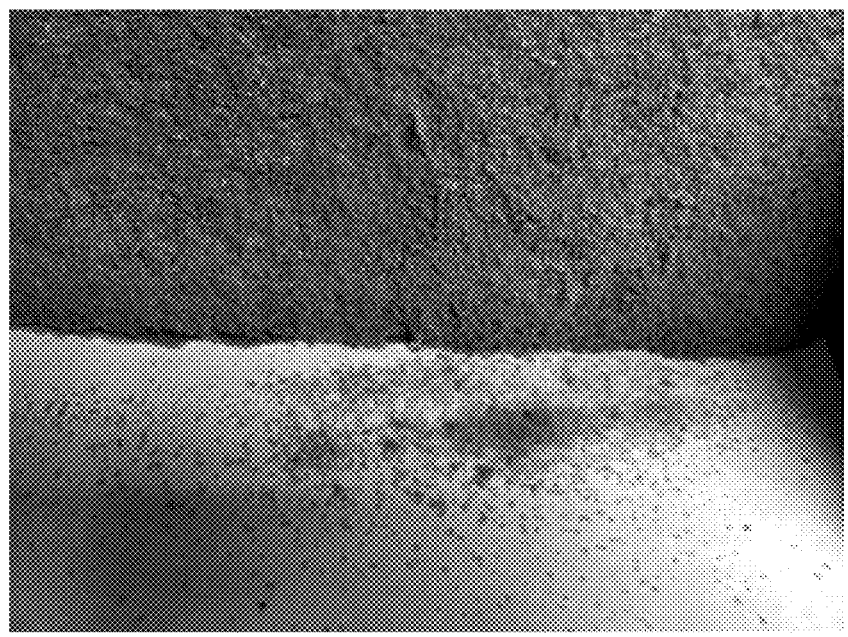
FIG. 8 is a copy of a photograph of the aerogel blanket of FIG. 7 after tapping the blanket on a solid surface.

The aerogel blanket produced in Example A was tested and compared to the blanket of Example B. A comparison of the photographs of Example A (FIG. 6) and Example B (FIG. 7) shows that the aerogel blanket of Example A exhibits a smoother, more uniform surface structure than does that of Example B. Each of the blankets was also evaluated for its ability to retain aerogel particles and minimize aerogel dusting. Samples of Example A and Example B were both held vertically and tapped on a solid surface to dislodge any unbound or loosely bound aerogel particles. As a comparison of FIG. 6 (Example A) and FIG. 8 (Example B) shows, the blanket of Example A shed little or no aerogel particulates while Example B released a significant quantity of aerogel particles that are readily visible on the white surface in front of the sample. This indicates that the aerogel blanket of Example A is much less prone to aerogel dusting that is Example B and that in use, the integrity of the blanket will be retained for a longer period.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method of making a nonwoven aerogel blanket, the method comprising:
   mixing aerogel particles and non-aerogel fibers with water to produce an aqueous slurry;
   flocculating and/or coagulating the slurry to form floc and a supernatant, the floc including aerogel particles and non-aerogel fibers; and
   dewatering the floc to make the nonwoven aerogel blanket.

2. The method of claim 1 wherein the aqueous slurry includes a charged compound that is a binder.

3. The method of claim 1 comprising forming an emulsion in the slurry.

4. The method of claim 1 wherein flocculating or coagulating breaks an emulsion.

5. The method of claim 1 wherein flocculating comprises neutralizing charges in the dispersion and/or altering the pH of the slurry.

6. The method of claim 1 wherein the floc comprises a homogeneous mixture of aerogel particles and fibers.

7. The method of claim 1 wherein an emulsion is formed by adding a charged emulsifying polymer and flocculating comprises adding an uncharged compound and/or a compound having a charge opposite to that of the emulsifying polymer.

8. The method of claim 1 wherein flocculation occurs via a charge neutralization process or via bridging of particles.

9. The method of claim 1 wherein the blanket comprises the aerogel particles; the fibers; and a binder, wherein the density of aerogel particles in the upper 10% of a cross section of the blanket is within +/−20% of the density of aerogel particles in the lowest 10% of the cross section.

10. The method of claim 9 wherein the blanket further comprises an infrared opacifier.

11. The method of claim 9 wherein the blanket has a thermal conductivity of less 40 mW/m° K at 150° C.

12. The method of claim 9 wherein the blanket a density of the blanket is less than 0.2 g/cc.

13. The method of claim 9 wherein the blanket exhibits corrosivity of less than 5 ppm HCl by ASTM C1617.

14. The method of claim 9 wherein the aerogel particles have an average diameter of less than 2.0 mm.

15. The method of claim 9 wherein all of the aerogel particles have a diameter of less than 4.0 mm.

16. The method of claim 9 wherein the blanket exhibits a flame spread index (ASTM E84) of less than 25 and a smoke developed index of less than 450 (ASTM E84).

17. The method of claim 9 wherein the blanket exhibits shrinkage of less than 2% at 650° C. when tested using ASTM method C356.

18. The method of claim 9 wherein the aerogel particles have a caloric content of less than 10 MJ/Kg.

19. The method of claim 9 wherein the blanket comprises a polymer comprising polyamine, polyacrylamide, dicyandiamide, or polydiallyldimethylammonium chloride.

20. The method of claim 9 wherein the fibers have an average length less than 5 mm, or none of the fibers have a length greater than 5 mm.

* * * * *